(12) United States Patent
Hirsch

(10) Patent No.: US 7,747,714 B1
(45) Date of Patent: Jun. 29, 2010

(54) METHOD AND COMMUNICATION SYSTEM FOR MANAGING A COMMUNICATION NETWORK

(75) Inventor: Lucian Hirsch, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 2385 days.

(21) Appl. No.: 10/129,540

(22) PCT Filed: Nov. 7, 2000

(86) PCT No.: PCT/DE00/03894

§ 371 (c)(1),
(2), (4) Date: Jul. 16, 2002

(87) PCT Pub. No.: WO01/35576

PCT Pub. Date: May 17, 2001

(30) Foreign Application Priority Data

Nov. 9, 1999 (DE) ................................ 199 53 877

(51) Int. Cl.
*G06F 15/173* (2006.01)

(52) U.S. Cl. ................. 709/223; 709/218; 709/219

(58) Field of Classification Search ........... 709/218, 709/219, 223
See application file for complete search history.

(56) References Cited

U.S. PATENT DOCUMENTS 6,012,100 A * 1/2000 Frailong et al. ............ 709/250
6,425,005 B1 * 7/2002 Dugan et al. ............... 709/223

FOREIGN PATENT DOCUMENTS

DE    198 01 785    7/1999

OTHER PUBLICATIONS

English translation of PCT application WO99/37102, 34 pp.
"Information Technology-Open Systems Interconnection-Systems Management: Alarm Reporting Function" International Standard, 1992, pp. 1-15.
Ericsson, "Alarm IRP and GUI Launch IRP presentation" 3rd Generation Working Group, Jul. 20-22, 1999, pp. 1-18.
Osamu Inoue et al., "Implementation of Surveillance and Control Interface for ATM Transport System", IEICE (Institute of Electronics Information and Communication Engineers)Technical Report, vol. 94, No. 370, Nov. 24, 1994, 6 pp.

* cited by examiner

*Primary Examiner*—Vivek Srivastava
*Assistant Examiner*—Adnan Mirza
(74) *Attorney, Agent, or Firm*—Staas & Halsey LLP

(57) ABSTRACT

Communication networks are automatically tested from a superordinate producer-independently managing network management center, such as when subordinate, producer-specific operation and maintenance centers (OMCs) are not occupied. Producer-dependent information is transmitted when an alarm report is sent and producer-specific hardware tests are automatically generated in the network management center (NMC). It is unnecessary for producer-specific object classes to be completely defined in the information model of the OMC-NMC interface. The tests automatically generated in the network management center can be triggered in response to errors, e.g. for a particular hardware board, or preventively, for example for the entire hardware of a network unit.

5 Claims, 2 Drawing Sheets

METHOD AND COMMUNICATION SYSTEM FOR MANAGING A COMMUNICATION NETWORK

CROSS REFERENCE TO RELATED APPLICATIONS

This application is based on and hereby claims priority to German Application No. 19953877.8 filed Nov. 9, 1999, the contents of which are hereby incorporated by reference.

BACKGROUND OF THE INVENTION

1. Field of the Invention

The invention relates to a method for managing a communication network, in particular for generating tests at a higher-level network management center, and to a communication system for carrying out the method.

2. Description of the Related Art

In radio communication systems, information (for example speech, image information, or other data) are transmitted with the aid of electromagnetic waves via a radio interface between transmitting and receiving radio stations (base station and mobile station). The emission of the electromagnetic waves is performed in this case at carrier frequencies that lie in the frequency band provided for the respective system. In the case of GSM (Global System for Mobile Communication), the carrier frequencies lie in the region of 900, 1800 and 1900 MHz. Frequencies in the frequency band of approximately 2000 MHz are provided for future mobile radio networks using CDMA or TD/CDMA transmission methods via the radio interface, for example the UMTS (Universal Mobile Telecommunication System) or other third-generation system.

The principles of a general management network, which are also denoted as TMN principles (TMN: Telecommunications Management Network) define a plurality of management levels for the management of a communication system, for example a mobile communication system, each level having a dual function. In the managing system, each level apart from the lowermost has a manager function for the level situated therebelow. In the managed system, each level apart from the uppermost has an agent function for the next higher level.

In an object-oriented environment, there is a multiplicity of objects that constitute network resources with a specific functionality in each case. In the case of the object-oriented environment, such as exists typically between manager and agent in a mobile radio network, each agent functionality is appropriately provided by a specific object that is available as a managed object (or object instance MOO of an object class.

The object is produced as the result of a modeling activity in which the parameters and boundary conditions, inter alia, are defined in addition to the functionality, and is known both to the manager and to the executive agent at the corresponding interface. In a mobile radio network, for example, the interface can be what is termed the O interface between an operation and maintenance center (OMC in FIG. 1) and a base station system (BSS).

An object instance of a specific managed class A, which is also denoted as managed object class, can include further object instances of the same or other classes. Such a relationship between object instances—not classes—is also denoted in the modeling as containment relationship.

A relationship between object classes which specifies that an object instance of a class is defined as a superior object for objects of another class, or can be so defined, is also denoted as name binding. A hierarchical assignment of objects in which the hierarchy is organized on the basis of name binding relationships is generally denoted as a naming tree.

In a telecommunication network, for example a mobile radio network, the network monitoring and control is usually performed in this case from two manager locations: on the one hand, centrally from an operation and maintenance center OMC, which corresponds to an element manager, and, on the other hand, on site by a local maintenance data terminal LMT (LMT: Local Maintenance Terminal) that can be connected to various network units. In a mobile radio network, for example, such network units are a base station subsystem BSC, a base station transceiver station BTSE (BTSE: Base Transceiver Station Equipment) that takes account of the hardware modeled or taken into account there, or a transcoder and rate adapter unit TRAU.

From an operational viewpoint, an overall telecommunication network managed by a service provider is subdivided into a plurality of network regions, as may also be seen from FIG. 1. Although the overall network includes hardware from various manufacturers, within each of these network regions both the network elements and the management systems set forth above are usually supplied from the same manufacturer, since the management at the operation and maintenance center OMC and at local maintenance data terminals must take account of all manufacturer-specific characteristics of the hardware. This includes, in particular, the tests of the functionality of individual components.

During the night, holidays and at the weekend, on the one hand the mobile radio network is monitored by a higher-level network management center that is usually denoted as network management center (NMC) since the regional operation and maintenance centers OMCs are unstaffed at these times. On the other hand, the interface between the network management center NMC and the regional operation and maintenance centers OMCs must remain manufacturer-independent, to permit a functional integration of manufacturer-specific network regions under a standard network management center NMC.

This independence of the OMC-NMC interface from manufacturer can arise in an object-oriented management environment through the exclusive use of what are termed functional object classes, in particular management object classes (functional-related MOC). The functional objects in this case model the network resources of a telecommunication network from a functional, manufacturer-independent point of view. By contrast therewith, the manufacturer-specific interface between the operation and maintenance center OMC and the network elements is also familiar with what are termed equipment-related management object classes (MOC) that differ from manufacturer to manufacturer. In this case, network elements are, for example, the base stations BSS, which are managed in a network region by an OMC.

To be able to react quickly to unforeseeable events, for example a failure of specific hardware components, the operator of the network management center NMC must be capable of starting appropriate tests. However, by contrast with operators at the operation and maintenance centers OMCs, the operators at the network management center have no system-specific knowledge of the equipment of a specific manufacturer. It is therefore impossible to carry out manufacturer-specific tests.

SUMMARY OF THE INVENTION

It is an object of the invention to propose an improved method for managing a communication network, in particular to permit in communication networks an automatic test functionality from a higher-level, manufacturer-independent network management center.

The conflict between the handling of manufacturer-independent functional management object classes, on the one hand, and manufacturer-specific, equipment-related management object classes, on the other hand, is solved by virtue of the fact that manufacturer-specific hardware tests are automatically generated at the network management center. This preferably takes place both specifically, that is to say after reception of alarms as a consequence of hardware faults, and generically, that is to say as a periodic preventive measure.

Automatic generation of manufacturer-specific hardware tests is therefore possible from a network management center NMC, although the information model of the OMC-NMC interface is not familiar with any manufacturer-specific object classes.

The tests automatically generated at the network management center NMC can be triggered both in a dedicated fashion, that is to say after the occurrence of faults in a specific hardware board, for example, and a preventive fashion, for example for the overall hardware of a network unit.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
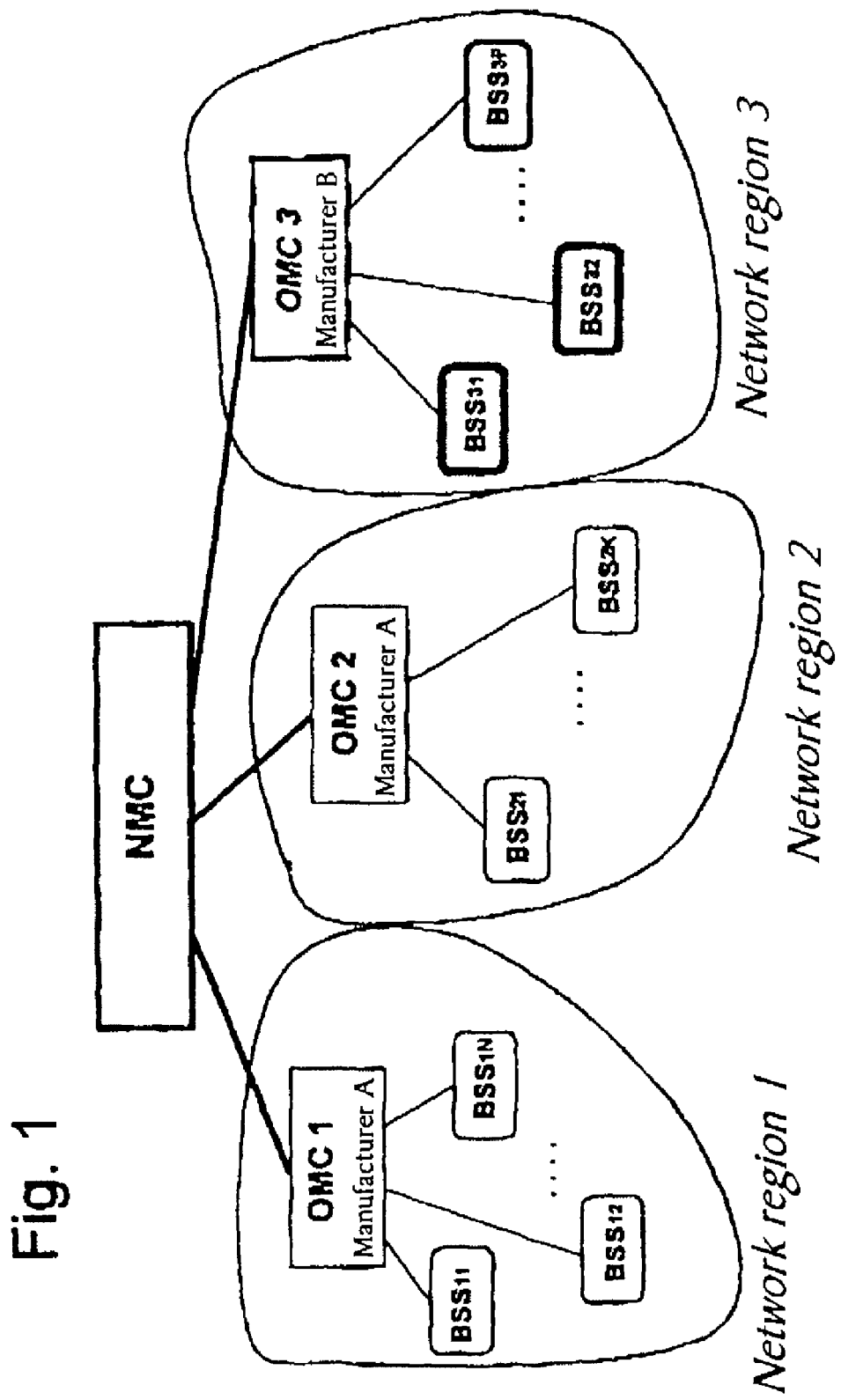
FIG. 1 is a block diagram of a conventional communication network, subdivided into a plurality of network regions.

Reference will now be made in detail to the preferred embodiments of the present invention, examples of which are illustrated in the accompanying drawings, wherein like reference numerals refer to like elements throughout.

Figure 2:
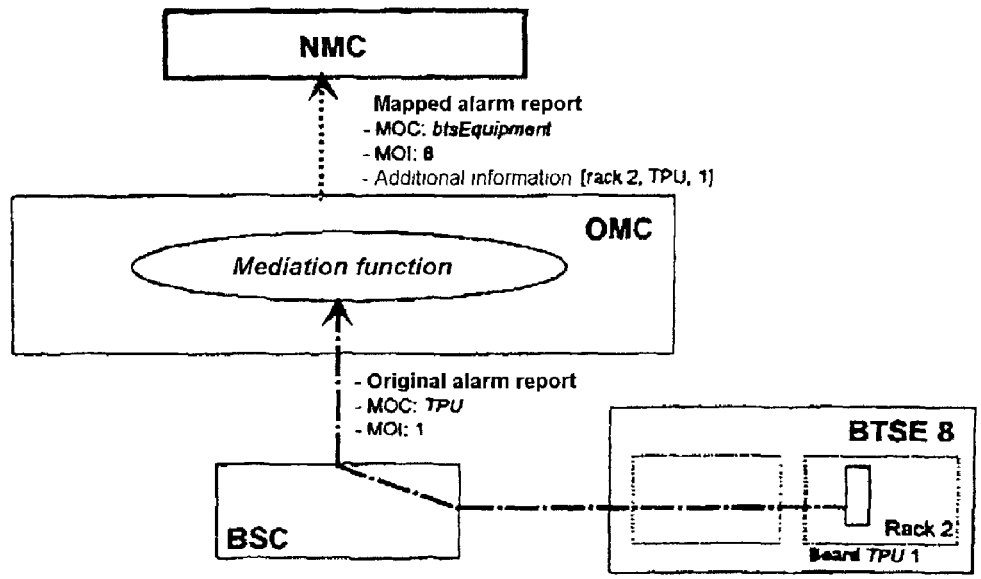
FIG. 2 is a block diagram of a schematic of the sequence of an alarm transmission procedure in such a communication network.
Figure 3:
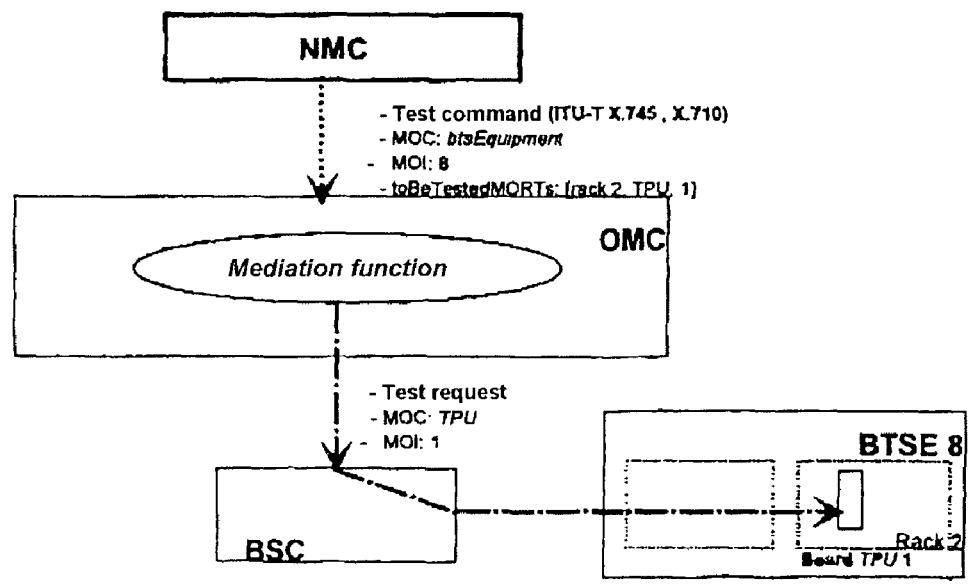
FIG. 3 is a block diagram of a schematic of the sequence of manufacturer-specific tests in such a communication network.

Exemplary method sequences for the equipment-specific testing of network devices from the network management center NMC are illustrated in FIGS. 2 and 3.

There are various management object classes MOCs for controlling the interfaces between the network management center NMC and the regional operation and maintenance centers OMCs. Since these interfaces must be manufacturer-independent, the information model of such a management interface includes only functional management object classes MOCs.

To integrate all the manufacturer-specific equipment in this information model, all the hardware modules, that is to say "boards", are preferably defined on the level of a network unit as a generic equipment summary management object class MOC.

For example, the following equipment summary management object classes MOCs are defined for the radio part of a mobile radio network that comprises the network units of base station controller BSC, base transceiver station equipment BTSE and transcoder and rate adapter unit TRAU:

bscEquipment
btsEquipment
trauEquipment.

The management object class bscEquipment relates to the equipment features of the base station controller, btsEquipment relates to the equipment features of the base transceiver station equipment, and trauEquipment relates to the equipment features of the transcoder and rate adapter unit.

Upon the occurrence of a hardware fault in a specific hardware module, for example in the case of FIG. 2 in a board 1 of the TPU type (TPU: Transceiver Power Unit), where this should be regarded as being only an example of a hardware board, in frame or rack No. 2 of the BTSE unit 8, this network unit generates an alarm notification with the parameters of:

object class MOC: TPU (equipment-related MOC at the manufacturer-specific OMC-BSS interface), and object instance MOI: . . . -8-2-1 (sequence of relatively distinguished names, in accordance with the naming tree).

This notification is passed on as manufacturer-specific alarm report via the network unit of base station controller BSC to the regional operation and maintenance center OMC.

To permit network monitoring at a higher-level network management center NMC during a time with unstaffed operation and maintenance centers OMCs, each manufacturer-specific operation and maintenance center OMC according to the present invention includes what is termed a mediation function. The mediation function converts all event reports, relevant to the network management center NMC, from the telecommunication network into the respectively corresponding functional management object class, specifically in accordance with the information model of the OMC-NMC interface. This mode of procedure is also denoted as what is termed a mapping procedure, and is sketched in FIG. 2.

In other words, alarm reports after hardware faults, that is to say equipment-related, manufacturer-specific alarms, are converted by the mediation function into alarms of functional equipment summary management objects, and subsequently passed on in the form of manufacturer-independent alarm reports to the network management center NMC. The original equipment-related alarm report is mapped in accordance with ITU-T X. 733 ("Systems Management: Alarm Reporting Function") into a functional, standardized alarm report having, for example, the following parameters:

object class: btsEquipment (models the functionality of the hardware in a network unit BTSE)

object instance: . . . -8.

With regard to the object instance, there is a 1:1 assignment at the OMC-NMC interface between the actual network units BTSE and the functional, generic instances of the object class btsEquipment.

In the case of the example illustrated in FIG. 2, the original alarm report transmitted to the operation and maintenance center OMC with "MOC=TPU" and "MOI=1" is mapped onto a mapped alarm report with the information "MOC=btsEquipment", "MOI=8" and "additional information (standardized parameter "additional information")=".

The manufacturer-specific information item that uniquely characterizes the original faulty hardware is therefore defined in the field of additional information by the mediation function. The additional information of the alarm report sent to the network management center NMC is defined as follows in the case of the present example in accordance with the standard ITU-T X.710 "Open Systems Interconnection—Common Management Information Service Definition":

rack number: 2, because the BTSE hardware is accommodated here in a plurality of racks,
board type: TPU and
board number: 1.

After the reception of the mediated alarm report, the NMC software of the network management center NMC detects with the aid of the object class ("equipment-summary" btsEquipment) that it is a question here of a manufacturer-specific hardware fault.

To investigate the fault more closely, that is to say to establish whether it is a transient or a permanent fault, whether the board is to be replaced etc., the network management center NMC must start a specific test for the current board (TPU). This should preferably be performed automatically. The NMC software evaluates the field of "additional information" for this purpose and can, together with the object class and object instance of the mediated alarm report, uniquely determine the address of the faulty board and simulate it.

As sketched in FIG. 3, the network management center NMC therefore generates a management action "M-ACTION" standardized in accordance with ITU-T X.745 (Systems Management: Test Management Function), in which the hardware to be tested is defined with the aid of what is termed the "nonSpecificForm". The parameter in this case is the field of "toBeTestedMORTs" or board to be tested. In the case of the present example, the 1st byte defines the frame or rack number in which the board to be tested or a printed circuit board to be tested is located. The 2nd byte defines the board type, that is to say in the present example TPU, and the 3rd byte defines the printed circuit board or board number, here 1.

The management action M-ACTION is sent from the network management center NMC to the operation and maintenance center NMC via the interface, the receiver always being a management object of equipment-summary type (equipment-summary object). This is the btsEquipment instance 8 in the present case. In the operation and maintenance center OMC, the mediation function converts this management action request (M-ACTION request) into a test request in accordance with the manufacturer-specific information model of the OMC-BSS interface. With the aid of the 1:1 assignment between the real base transceiver station equipment BTSE and the equipment summary instance btsEquipment and the parameter value "toBeTestedMORTs", the mediation function can uniquely define the address of the board to be tested in the real telecommunication network. The test request in this case advantageously also includes the identification of the manufacturer-specific test predefined for the current board.

The test results sent back from the network unit, here BTSE 8, are once again converted by the mediation function in the operation and maintenance center OMC in accordance with the information model of the OMC-NMC interface, and uniquely correlated with the previous NMC test request of the network management center NMC with the aid of the standardized parameter of "testInvocationId". In this case, after the standardized NMC test command, the OMC sends a response that includes the parameter value of "testInvocationId" so that a test operation is uniquely characterized. Subsequent to the end of the test, the same value is inserted into the testResultNotification for the network management center NMC by the operation and maintenance center OMC.

The mapped or mediated test results can also be used by the NMC software for automatically generating what are termed trouble tickets, so that appropriate repair measures can be initiated on site.

The definition of the OMC-NMC interface additionally and/or alternatively also permits the automatic generation of periodic, preventive hardware tests at the network management center NMC. In the test request standardized in accordance with ITU-T X.745, the network management center NMC can use a special value for the board to be tested in the attribute "toBeTestedMORTs". The mediation function can interpret this command, for example, as a test request for that overall network unit which is modeled by the receiver of the test request. This is the btsEquipment instance 8 in the present example. Consequently, the mediation function generates a plurality of individual test commands that are specific to each hardware board and are sent sequentially to the network unit BTSE 8.

After each test, the individual test results are collected by the mediation function, mapped and transmitted to the higher-level network management center NMC as a test results report, standardized in accordance with ITU-T X.745, or what is termed "testResultNotification".

The invention has been described in detail with particular reference to preferred embodiments thereof and examples, but it will be understood that variations and modifications can be effected within the spirit and scope of the invention.

The invention claimed is:

1. A method for managing a communication network having a device on a first management level, a device on a second management level and a device on a third management level, comprising:
   using functional object classes for the communication between the device on the first management level and the device on the second management level;
   using hardware-oriented object classes for the communication between the device on the second management level and the device on the third management level; and
   transmitting, from the device on the first management level to the device on the second management level, a message requesting a hardware test of the device on the third management level;
   after said transmitting of the message, transmitting from the device on the second management level to the device on the first management level, a message providing hardware-related information about a condition of the device on the third management level; and
   checking a condition of the device on the third management level in response to said transmitting of the message.

2. The method as claimed in claim 1, wherein said transmitting of the message occurs one of cyclically and after a fault of the device on the third management level.

3. The method as claimed in claim 1, further comprising activating manufacturer-specific tests in response to said transmitting of the message.

4. A device on a first management level of a communication network having an interface to a device on a second management level and using functional object classes for communication therewith, comprising:
   a transmitting part transmitting to the device on the second management level a message requesting a hardware test of a device on a third management level, the device on the third management level using hardware-oriented object classes for communication with the device on the second management level, and, after said transmitting of the message, further receiving from the device on the second management level, a message providing hardware-related information about a condition of the device on the third management level and checking a condition of the device on the third management level in response to said transmitting of the message.

5. A communication system, comprising:
a device on a first management level;
a device on a second management level;
a device on a third management level;
an interface between the device on the first management level and the device on the second management level using functional object classes for communicating;
an interface between the device on the second management level and the device on the third management level using hardware-oriented object classes for communicating; and
a transmitting part transmitting from the device on the first management level to the device on the second management level a message requesting a hardware test of the device on the third management level, after said transmitting of the message, further transmitting from the device on the second management level to the device on the first management level, a message providing hardware-related information about a condition of the device on the third management level and checking a condition of the device on the third management level in response to said transmitting of the message.

* * * * *